United States Patent [19]

Harada et al.

[11] Patent Number: 5,268,219

[45] Date of Patent: Dec. 7, 1993

[54] POLYAMIDE RESIN COMPOSITION AND FILM THEREFROM

[75] Inventors: Masahiro Harada; Takeo Hayashi; Hiroyuki Mishima; Hisashi Shimazaki, all of Hiratsuka, Japan

[73] Assignee: Mitsubishi Gas Chemical Company, Inc., Tokyo, Japan

[21] Appl. No.: 754,515

[22] Filed: Sep. 4, 1991

[30] Foreign Application Priority Data

Sep. 11, 1990 [JP] Japan .................. 2-239029
Nov. 28, 1990 [JP] Japan .................. 2-322465

[51] Int. Cl.$^5$ ............................ B32B 27/34
[52] U.S. Cl. .................. 428/220; 428/474.4; 428/475.5; 525/432
[58] Field of Search ......... 525/432; 428/220, 474.4, 428/474.7, 474.9, 475.5, 910

[56] References Cited

U.S. PATENT DOCUMENTS

4,098,860  7/1978  Etou et al. ................ 264/171
5,106,693  4/1992  Harada et al. ............. 428/412

FOREIGN PATENT DOCUMENTS

0130589  9/1985  European Pat. Off. .
0270796  6/1988  European Pat. Off. .
53-083892  7/1978  Japan .

OTHER PUBLICATIONS

Chemical Abstracts, vol. 104, No. 8, Feb. 24, 1986, Columbus, OH, U.S.A., Chiba K. et al., "Polyamide Resin Composition", p. 29, column 2.

Chemical Abstracts, vol. 102, No. 16, Apr. 22, 1985, Columbus, OH, U.S.A. Toray Industries, Inc. "Photosensitive Polyamde Resin Composition for Printing Plate Preparation", p. 601, column 1.

Chemical Abstracts, vol. 100, No. 10, Mar. 5, 1984, Columbus, OH, U.S.A. Dainichiseika Color and Chemicals Mfg. Co., Ltd. "Unsaturated Polyester Resin Composition Having Good Pigment-Dispersing Properties", p. 39, Column 2.

Primary Examiner—Paul J. Thibodeau
Assistant Examiner—D. S. Nakarani
Attorney, Agent, or Firm—Wenderoth, Lind & Ponack

[57] ABSTRACT

A polyamide resin composition obtained by melting and kneading (A) a first polyamide containing not less than 90 mol %, based on the total recurring units, of a m-xylylene adipamide unit of the formula, $$+NHCH_2-C_6H_4-CH_2NHCO+CH_2+_4CO+$$

and (B) a second polyamide showing a semicrystallization time of not more than 30 seconds in a constant-temperature crystallization at 160° C. and having a solubility parameter in the range of $13 \pm 1.5$;

(C) under the conditions where the following relationship is satisfied, $$(0.025C - 2.2) \leq \log R \leq (0.025C - 0.5)$$

wherein C is a proportion (wt. %) of the first polyamide based on the total weight of the first and second polyamides, and R is a ratio of the melt viscosity of the first polyamide to the melt viscosity of the second polyamide at a temperature higher by 20° C. than the melting point of that one of the first and second polyamides which has a higher melting point than the other, provided that C is in the range of 20 to 95 (wt. %);

and a film produced therefrom.

7 Claims, No Drawings

POLYAMIDE RESIN COMPOSITION AND FILM THEREFROM

DETAILED DESCRIPTION OF THE INVENTION

The present invention relates to a polyamide resin composition and a film produced therefrom. More specifically, it relates to a polyamide resin composition which is excellent in gas-barrier properties, liquid-barrier properties and transparency, and a film which is suitably usable as a packing film for foods, drugs, cosmetics, etc.

Polyamide produced by a melt-polycondensation reaction between m-xylylenediamine and adipic acid (to be referred to as "nylon MXD6" hereinafter) has excellent gas-barrier properties, and it also has excellent thermal stability when melted. Further, nylon MXD6 is co-extrudable or co-injection moldable with various thermoplastic resins such as polyethylene terephthalate, nylon 6, polypropylene, etc. Therefore, the utilization thereof in multi-layer structure articles having gas-barrier properties is actively under way.

However, nylon MXD6 in an unstretched state or in a state of being stretched at a low stretch ratio has a defect in that it is whitened or crystallized to show a decrease in transparency when used as a film produced therefrom, when heated beyond the glass transition temperature at a molding time, when stored under high humidity or when treated with water vapor or hot water for sterilization.

U.S. Pat. No. 4,908,272 proposes a polyamide mixture containing nylon MXD6 and a noncrystalline polyamide obtained from an aliphatic dicarboxylic acid, isophthalic acid and terephthalic acid as a dicarboxylic acid component and m-xylylenediamine as a diamine component. Further, U.S. patent application Ser. No. 277,244 proposes a polyamide mixture containing nylon MXD6 and a copolyamide obtained from isophthalic acid and terephthalic acid as a dicarboxylic acid component and hexamethylenediamine as a diamine component.

However, both of the above polyamide mixtures are noncrystalline, and yet they are whitened due to hot water treatment or water absorption for a long period of time, although the whitening degree is small. Therefore, a film produced from any one of the above mixtures, too, shows an increase in haze due to hot water treatment or water absorption for a long period of time.

For this reason, nylon MXD6 in an unstretched state or in a state of being stretched at a low stretch ratio has been rarely used for a film or a packaging material produced from such a film.

It is an object of the present invention to provide a novel polyamide resin composition.

It is another object of the present invention to provide a polyamide resin composition which retains excellent transparency even in an unstretched state or a state of being stretched at a low stretch ratio and which has excellent gas-barrier properties.

It is still another object of the present invention to provide a polyamide resin composition which, even in an unstretched state or a state of being stretched at a low stretch ratio, retains excellent transparency even when processed after formed into a film, when stored under highly humid conditions, or when treated with water vapor or hot water for sterilization, and which is excellent in gas-barrier properties and is usable as an outer layer of a multi-layer structure article which is directly exposed under highly humid atmosphere.

It is further another object of the present invention to provide an unstretched film, a biaxially stretched film and a multi-layer film, which are obtained from the polyamide resin composition of the present invention and have excellent properties described above.

The above and other objects and advantages of the present invention will be apparent from the following description.

According to the present invention, the above objects and advantages of the present invention are achieved, first, by a polyamide resin composition obtained by melting and kneading (A) a first polyamide containing not less than 90 mol %, based on the total recurring units, of a m-xylene adipamide unit of the formula,

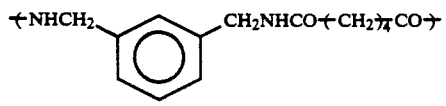

and (B) a second polyamide showing a semicrystallization time of not more than 30 seconds in a constant-temperature crystallization at 160° C. and having a solubility parameter in the range of 13±1.5;

under the conditions where the following relationship is satisfied, $$(0.025C - 2.2) \leq \log R \leq (0.025C - 0.5) \tag{1}$$

wherein C is a proportion (wt. %) of the first polyamide based on the total weight of the first and second polyamides, and R is a ratio of the melt viscosity of the first polyamide to the melt viscosity of the second polyamide at a temperature higher by 20° C. than the melting point of that one of the first and second polyamides which has a higher melting point than the other, provided that C is in the range of 20 to 95 (wt. %).

The first polyamide (A) used in the present invention contains not less than 90 mol % of the m-xylylene adipamide unit of the above formula based on the total recurring units.

When the content of the structural unit of the above formula, produced from m-xylylene diamine and adipic acid, in the polyamide is smaller than 90 mol %, the resultant polyamide shows an increase in gas permeability and an extreme decrease in crystallization, and no material meeting the objects of the present invention can be obtained.

The first polyamide (A) preferably contains not less than 95 mol % of the m-xylylene adipamide unit based on the total recurring units.

The first polyamide (A) may contain other amide unit(s) in an amount of less than 10 mol %, preferably less than 5 mol % in addition to the m-xylylene adipamide unit.

The diamine and dicarboxylic acid to constitute the "other amide unit(s)" are as follows. For example, the diamine preferably includes aliphatic diamines having 4 to 12 carbon atoms such as hexamethylenediamine, tetramethylenediamine, etc.; alicyclic diamines such as 1,3-bisaminomethylcyclohexane, etc; and p-xylylene diamine. The dicarboxylic acid preferably includes aliphatic dicarboxylic acids having 4 to 12 carbon atoms such as succinic acid, sebacic acid, dodecanedioic acid and aromatic dicarboxylic acids such as isophthalic acid, terephthalic acid, naphthalenedicarboxylic acid, etc.

The first polyamide (A) may have terminal(s) blocked with, e.g. a monoamine, a monocarboxylic acid, or the like, which has been added as a molecular weight regulator when the polycondensation has been carried out.

The first polyamide (A) is usually produced by a melt-polycondensation method, in which, for example, a material composed mainly of a nylon salt formed of m-xylylene diamine and adipic acid is heated in the presence of a water solvent under pressure and polymerized in a molten state while water added and water formed during the polycondensation are removed.

Alternatively, the first polyamide (A) can be produced by adding a diamine mainly containing m-xylylene diamine to a dicarboxylic acid which mainly contains adipic acid and is in a molten state, and polycondensing these components at an atmospheric pressure.

In the latter method, the reaction system is maintained in a uniform liquid state without adding water as a solvent. For this purpose, the polycondensation is carried out by continuously adding m-xylylene diamine to the reaction system and elevating the temperature of the reaction system such that the reaction temperature does not drop below the melting points of oligoamide and polyamide being formed. A polymer having a higher molecular weight formed by solid-phase polymerization of the resultant polymer may be used as a first polyamide (A) as well.

The second polyamide (B) used in the present invention is a polyamide showing a semicrystallization time (according to a depolarized light intensity method) of not more than 30 seconds in a constant-temperature crystallization at 160° C., and has a solubility parameter in the range of 13±1.5.

When the semicrystallization time of the second polyamide (B) is not more than 30 seconds as described above, the second polyamide (B) undergoes crystallization when melt-mixed with the first polyamide (A) and formed into a film, and the resultant crystal of the second polyamide (B) effectively works as a nucleating agent for crystallization of the first polyamide (A). As a result, the first polyamide (A) does not form too large spherulites.

On the other hand, when the above semicrystallization time of the second polyamide (B) exceeds 30 seconds, the crystallization rate of the second polyamide (B) is low, so that it does not arrive at crystallization when melt-mixed with the first polyamide (A) and formed into a film. Thus, the second polyamide (B) does not work as a nucleating agent for the crystallization of the first polyamide (A), and hence, the first polyamide (A) forms too large spherulites. As a result, no film having excellent transparency can be obtained.

The first polyamide (A) used in the present invention, by its nature, tends to form a large size of spherulites due to water absorption and moisture absorption after formed into a film or during the crystallization under heat at a temperature higher than the glass transition temperature, when no nucleating material is present. The so-formed large spherulites cause light scattering and increases the degree of haze, which results in a decrease in the transparency of the film. Furthermore, when the second polyamide (B) used in the present invention is not crystallized at a film-forming time, it is impossible to expect the crystallization of the first polyamide (A) which is induced by the crystallization of the second polyamide (B), and as a result, the resultant film cannot have improved gas-barrier properties.

The semicrystallization time of the second polyamide (B) refers not only to the semicrystallization time of the polyamide alone but also to the crystallization time of the polyamide containing a nucleating agent. Therefore, even a polyamide which shows a semicrystallization time of more than 30 seconds may be used as a second polyamide (B) in the present invention if the semicrystallization time of the polyamide is decreased to not more than 30 seconds by the incorporation of a nucleating agent.

The second polyamide (B) preferably shows a semicrystallization time of not more than 20 seconds.

The second polyamide (B) used in the present invention has a solubility parameter of 13±1.5. The solubility parameter used in the present specification refers to the constants of Small described in Table on page 97 of "The Technology of Plasticizers", by J. Kern Sears and Joseph R. Darby, issued in 1982.

When a polyamide having a solubility parameter outside the above range is used, the resultant polyamide composition exhibits higher haze, and it is impossible to obtain such a material for a packaging material having excellent transparency as is intended in the present invention.

The second polyamide (B) is specifically selected, for example, from nylon 6, nylon 66 and a blend or copolymer of one or both of nylon 6 and nylon 66 with any one(s) of nylon 46, nylon 610, nylon 612, nylon 11, nylon 12, etc. Further, as far as the afore-described conditions on the semicrystallization time and the solubility parameter are fulfilled, there may be used a copolymer composed of at least two amide units out of amide units which constitute a variety of the above nylons.

In the polyamide resin composition of the present invention, the amount of the first polyamide (A) is in the range of 20 to 95% by weight based on the total weight of the first polyamide (A) and the second polyamide (B).

The polyamide resin composition of the present invention is obtained by melt-kneading the first polyamide (A) and the second polyamide (B) of which the amounts are in the above range under the conditions where the following relationship is fulfilled.

$$(0.025C - 2.2) \leq \log R \leq (0.025C - 0.5).$$

In the above relationship, C is the value for a weight percentage of the first polyamide (A) based on the total weight of the first polyamide (A) and the second polyamide (B), and R is a ratio of the melt viscosity of the first polyamide (A) to the melt viscosity of the second polyamide (B) at a temperature higher by 20° C. than the melting point of that one of the first and second polyamides (A) and (B) which has a higher melting point than the other.

To qualitatively explain the above relationship, the above relationship shows that with an increase in the ratio R, the proportion of the first polyamide (A) should be increased and that with a decrease in the ratio R, the proportion of the first polyamide (A) should be decreased.

In the present invention, it is preferred to adjust one of the polyamide A or the polyamide B which has a smaller mixing ratio (volumetric ratio) than the other to have a comparatively low melt viscosity in order to obtain a transparent film. Specifically, when the mixing ratio of the polyamide A is smaller (when C is less than about 50%), R is required to be set in the range which does not exceed the upper limit. When the R exceeds the upper limit, the polyamide A of which the mixing ratio is smaller has too high a melt viscosity, and no film having a low haze can be obtained. The reason for this is considered to be as follows. Since the polyamide A has too high a melt viscosity, the polyamide A is not fully dispersed in the polyamide B, and the polyamide B as a nucleating agent does not work on the polyamide A effectively. The lower limit of R is determined in view of moldability. When R is lower than the lower limit, the flowability of the resin mixture becomes unstable (the rate of outflow from a die is not uniform in the width direction of the die) due to a large difference in melt viscosity between the two polyamides although the resultant film shows low haze. Thus, it is difficult to stably produce a film having a uniform thickness.

On the other hand, when the mixing ratio of the polyamide B is smaller (when C is more than about 50%), R is required to be set in the range which is not lower than the lower limit. When the R is lower than the lower limit, the polyamide B of which the mixing ratio is smaller has too high a melt viscosity, and no film having a low haze can be obtained. The reason for this is considered to be as follows. Since the polyamide B is not fully dispersed in the polyamide A, and the effect of the polyamide B as a nucleating agent does not work on the entirety of the mixture. The upper limit of R is determined in view of moldability. When R exceeds the upper limit, the flowability of the resin mixture becomes unstable (the rate of outflow from a die is not uniform in the width direction of the die) due to a large difference in melt viscosity between the two polyamides although the resultant film shows low haze. As a result, it is difficult to stably produce a film having a uniform thickness.

In the present invention, the first polyamide (A) preferably shows a relative viscosity between 1.9 and 3.7, and the second polyamide (B) preferably shows a relative viscosity between 2.0 and 4.2. Further, the first polyamide (A) preferably shows a melt viscosity of about 600 to about 30,000 poise at a temperature higher by 20° C. than the melting point thereof, and the second polyamide (B) preferably shows a melt viscosity of about 400 to about 17,000 at a temperature which is similarly higher by 20° C. than the melting point thereof.

The polyamide resin composition of the present invention can give a film having excellent gas-barrier properties, liquid-barrier properties and transparency. Owing to these excellent properties, such a film is suitably usable as a packaging film.

Therefore, according to the present invention, there are provided an unstretched film and a biaxially stretched film produced from the polyamide resin composition of the present invention.

The above unstretched film of the present invention has its characteristic feature in that the unstretched film as a film having a thickness of 50 μm shows a haze value of not more than 7%.

The unstretched film of the present invention preferably has a thickness of 10 to 100 μm, and more preferably has a thickness of 15 to 80 μm.

In this invention, the conversion between the film thickness and the haze value can be made by the following relational equation on the assumption that the Lambert-Beer's law is effected between the quantity of transmission light and the thickness.

$$\left(\log \frac{1}{1 - \text{haze value}/100}\right)/d = k$$

wherein d is the thickness of a film, and k is a constant.

That is, the above relational equation is derived from the following two relational equations.

$$\text{Haze value} = \frac{D}{T} \times 100(\%)$$

wherein D is a quantity of diffuse transmission light, and T is a total quantity of transmission light.

$$\log \frac{T}{PT} = k \cdot d$$

wherein T, k and d are as defined above, and PT is a quantity of parallel transmission light and equals a value of T−D.

It should be understood that the above conversion between the film thickness and the haze value can apply to that of the biaxially stretched film of the present invention to be described later.

The unstretched film of the present invention is obtained from the polyamide resin composition preferably containing 60 to 95% by weight of the first polyamide (A), provided by the present invention. The unstretched film obtained from this preferred embodiment of the polyamide resin composition also has a haze value of not more than 7% when it is converted to a film having a thickness of 50 μm.

The above unstretched film of the present invention can be produced from the polyamide resin composition of the present invention by a known film-forming method such as a T-die extrusion method, a cylindrical die extrusion method (inflation method), a co-extrusion method, an injection method, a co-injection method, a blow molding method or a combination of these methods.

The molding temperature for forming the film is preferably 235° to 300° C., more preferably 245° to 285° C.

When the molding temperature exceeds 300° C., the resultant polyamide film is whitened due to water absorption, treatment with hot water or treatment under heat at a temperature equal to or higher than the glass transition temperature, and therefore, the film having excellent transparency intended in the present invention cannot be obtained.

When the molding temperature is lower than 235° C., it is difficult to mold the polyamide resin composition into a film since the first polyamide (A) cannot be sufficiently melted.

The molding temperature for forming the polyamide film of the present invention refers to a temperature of the polyamide measured at the terminal outlet of a film-forming machine such as an extruder, an injection molding machine or the like, or the temperature of the polyamide measured at the outlet of a die located at the terminal end of a film-forming machine.

The residence time for forming the film is preferably not more than 7 minutes, more preferably 0.7 to 5 minutes.

The residence time for forming the film in the present invention refers to a period of time from a point of time when a material containing a polyamide mixture is charged into the heat-melting cylinder of a film-forming machine such as an extruder, an injection molding machine or the like through the feed port to a point of time when the polyamide mixture is discharged through the terminal end of a film-producing apparatus.

When the residence time exceeds 7 minutes, the resultant polyamide mixture film is liable to be whitened due to water absorption, treatment with hot water or treatment under heat at a temperature equal to or higher than the glass transition temperature, and therefore, the film having excellent transparency intended in the present invention cannot be obtained.

When the residence time is less than 0.5 minutes, the mixing of the first polyamide (A) and the second polyamide (B) is sometimes insufficient, although it depends on a film-forming machine used. When the mixing is insufficient, the resultant film shows a high haze value, and moreover, the haze value increases further due to water absorption, treatment with hot water or treatment under heat.

The biaxially stretched film of the present invention has a characteristic feature in that it as a film having a thickness of 25 μm has a haze value of not more than 3.5%.

The biaxially stretched film of the present invention preferably has a thickness of 10 to 50 μm, and more preferably has a thickness of 15 to 40 μm.

The biaxially stretched film of the present invention is obtained from the polyamide resin composition preferably containing 20 to 60% by weight of the first polyamide (A), provided by the present invention. The biaxially stretched film obtained from this preferred embodiment of the polyamide resin composition also has a haze value of not more than 3.5% when it is converted to a film having a thickness of 25 μm.

The above biaxially stretched film of the present invention can be produced by any one of known stretching methods such as a tenter method, a double bubble method, a roll stretching method, a rolling method, etc.

The unstretched film and stretched film of the present invention can be also used as a constituent of a multi-layer film or a multi-layer structure, which are formed by a laminating method such as an extrusion laminating method, a dry laminating method, etc.

Therefore, according to the present invention, there is provided an unstretched multi-layer film and a biaxially stretched multi-layer film, each of which is composed of layer(s) of the polyamide resin composition of the present invention and layer(s) of other thermoplastic resin(s).

The unstretched multi-layer film of the present invention preferably has a layer composed of the polyamide resin composition of the present invention which contains 60 to 95% by weight of the first polyamide (A).

The "other thermoplastic resin(s)" described above is preferably selected, for example, from polyolefins, polycarbonates, polyesters, styrene polymers and polyamides. Preferred as a polyolefin are, for example, polyethylene and polypropylene. Preferred as a polycarbonate is a bisphenol A type polycarbonate. Preferred as a polyester is polyethylene terephthalate. Preferred as a styrene polymer is polystyrene, and preferred as a polyamide are those which are usable as a second polyamide (B) in the composition of the present invention. Of the above thermoplastic resins, particularly preferred are the polyolefin, polycarbonate, polyethylene terephthalate and polyamide usable as a second polyamide (B).

The above unstretched multi-layer film of the present invention can be produced by co-extruding the polyamide resin composition of the present invention and other thermoplastic resin with a known apparatus, or it can be also produced by separately preparing unstretched film(s) produced from the polyamide resin composition of the present invention and unstretched film(s) produced from other thermoplastic resin, and adhering these films to each other via an adhesive layer.

The biaxially stretched multi-layer film of the present invention preferably has a layer composed of the polyamide resin composition of the present invention which contains 20 to 60% by weight of the first polyamide (A).

The biaxially stretched multi-layer film can be produced, for example, by biaxially stretching the above-produced unstretched multi-layer film, i.e. one obtained by co-extruding the above resins or adhering the above films via an adhesive layer.

The present invention is more specifically described hereinbelow by reference to Examples.

The evaluation methods used in Examples and Comparative Examples are as follows.

(1) Melt viscosity:

Measured with a capillary rheometer (flow tester CFT-50, supplied by Shimadzu Corporation).

Capillary dimension: diameter 1 mmφ, length 10 mm, pressure 10 kg/cm².

Relative viscosity:

1 Gram of a sample was dissolved in 100 ml of 96% sulfuric acid, and the measurement was conducted at 25° C. with a Cannon-Fenske type viscometer. The relative viscosity was calculated on the basis of the following equation.

$$\text{Relative viscosity} = \frac{\text{Time (second) required for dropping of sulfuric acid solution of polymer}}{\text{Time (second) required for dropping of sulfuric acid}}$$

(2) Semicrystallization time:

Measured according to a depolarized light intensity method with a crystallization rate measuring apparatus (MK701, supplied by Kotaki Seisakusho) under the following conditions.

Temperature for melting a sample: temperature by 15° C. higher than the melting point Time for melting a sample: 3 minutes Temperature of a crystallizing bath: 160° C.

(3) Solubility parameter (SP)

Calculated from the following equation, on the basis of Small's constant described on "The Technology of Plasticizers", p.97 (written by J. Kern Sears and Joseph R. Darby and issued in 1982).

$$SP = \frac{\Sigma F}{V}$$

F: Small's molar-attraction constant
V: Molar volume (cm³/mol).

(4) Oxygen permeability

Measured according to ASTM D3985 with an oxygen permeability measuring apparatus (model: OX-TRAN 10/50A, supplied by Modern Controls Co., Ltd.) under the following conditions.

Temperature: 23° C., Relative humidity (RH) 60% or 100%.

(5) Haze:

Measured according to ASTM D1003 with a color-difference meter (Z-Σ80, supplied by Nippon Denshoku Kogyo K.K.) under the following conditions.

Conditions for hot water treatment: Immersion in boiling water for 30 minutes.

EXAMPLE 1

Pellets of nylon MXD6 (hereinafter sometimes simply abbreviated as N-MXD6) (relative viscosity: 3.6) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 1.7, measured at 260° C.). This pellet mixture was melted and kneaded at 260° C. with a single-screw extruder (screw diameter: 90 mmφ, L/D: 35, a screw type: full flighted), and then extruded onto a running metal belt. The extrudate was cooled in a strand form, and cut with a rotary cutter to obtain pellets of the polyamide mixture.

Then, this polyamide mixture was extruded with a single-screw extruder (screw diameter: 20 mmφ, L/D: 25, screw type: full flighted) according to a T-die method of a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

Table 1 shows the performances of the resultant film. The composition of the starting materials is also shown in Table 1.

EXAMPLES 2 AND 3, AND COMPARATIVE EXAMPLES 1 AND 2

A combination of pellets of nylon MXD6 and nylon 6 of which the melt viscosity ratio was different from that in Example 1 was processed in the same manner as in Example 1 to prepare pellets of a polyamide mixture of which the mixing ratio is shown in Table 1 (Examples) and in Table 2 (Comparative Examples). That is, the nylon MXD6 used was one having a relative viscosity of 3.6, which was the same as that used in Example 1, or nylon MXD6 having a relative viscosity of 2.6. The nylon 6 used was the one having a relative viscosity of 4.1, which was the same as that used in Example 1, the one having a relative viscosity of 2.2, or the one having a relative viscosity of 3.5. Then, films were produced from the pelletized polyamide mixtures in the same manner as in Example 1.

Tables 1 and 2 show also the performances of the above-obtained films.

COMPARATIVE EXAMPLE 3

A film having a width of about 120 mm and a thickness of 0.05 mm was prepared from the same nylon MXD6 as that used in Example 1 in the same manner as in Example 1 with a single-screw extruder (screw diameter 20 mmφ, L/D: 25, screw type: full flighted) according to a T-die method at a cylinder temperature between 265° C. and 270° C., at a T-die temperature of 270° C. at a screw revolution rate of 40 rpm and at a cooling roll temperature of 75° C. Table 2 shows the performances of the film and composition of the starting materials.

EXAMPLES 4–6 AND COMPARATIVE EXAMPLE 4

Pellets of the same nylon MXD6 as that used in Example 1 and pellets of the same nylon 6 as that used in Example 1 were mixed with a tumbler in the mixing ratio shown in Table 1 or Table 2 to prepare pellet mixtures.

Then, these polyamide mixtures were separately extruded with a single-screw extruder (screw diameter: 20 mmφ, L/D: 25, screw type: full flighted) according to a T-die method at a cylinder temperature between 265° C. and 270° C., at a T-die temperature of 270° C. at a screw revolution rate of 40 rpm and at a cooling roll temperature of 75° C., whereby films having a width of about 120 mm and a thickness of about 0.05 mm were obtained. Table 1 shows the performances of the films (obtained in Examples) and compositions of the materials, and Table 2 shows the performances of the film (obtained in Comparative Example) and composition of the materials.

TABLE 1

| Example No. | 1 | 2 | 3 | 4 | 5 | 6 |
|---|---|---|---|---|---|---|
| Relative viscosities of polyamides | | | | | | |
| N-MXD6 | 3.6 | 3.6 | 2.6 | 3.6 | 3.6 | 3.6 |
| Nylon 6 | 4.1 | 3.5 | 2.2 | 4.1 | 4.1 | 4.1 |
| Blend ratio (by weight) (N-MXD6/nylon 6) | 80/20 | 80/20 | 80/20 | 95/5 | 90/10 | 75/25 |
| Melt viscosity ratio R | 1.7 | 3.3 | 10.2 | 1.7 | 1.7 | 1.7 |
| log R (Measurement temperature °C. for R) | 0.23 (260) | 0.52 (260) | 1.0 (260) | 0.23 (260) | 0.23 (260) | 0.23 (260) |
| log R calculated by the equation (1) | | | | | | |
| Upper limit | 1.5 | 1.5 | 1.5 | 1.9 | 1.75 | 1.38 |
| Lower limit | −0.2 | −0.2 | −0.2 | 0.2 | 0.05 | −0.33 |
| Film thickness (μm) | 50 | 45 | 50 | 40 | 41 | 42 |
| Haze (%) | | | | | | |
| Initial value | 1.5 | 2.2 | 2.4 | 2.3 | 2.5 | 2.3 |
| After treatment with hot water | 4.2 | 4.9 | 4.0 | 7.5 | 5.3 | 3.9 |
| Oxygen permeation rate (cc/m² · day · atm) | 6.4 | 8.2 | 8.5 | 8.7 | 9.0 | 9.8 |

Conditions for measurement of oxygen permeation rate: 100% RH

TABLE 2

| Comparative Example No. | 1 | 2 | 3 | 4 |
|---|---|---|---|---|
| Relative viscosities of polyamides | | | | |
| N-MXD6 | 3.6 | 2.6 | 3.6 | 3.6 |
| Nylon 6 | 2.2 | 4.1 | — | 4.1 |
| Blend ratio (by weight) (N-MXD6/nylon 6) | 80/20 | 80/20 | 100/0 | 99/1 |
| Melt viscosity ratio R | 44.2 | 0.4 | — | 1.7 |
| log R (Measurement temperature °C. for R) | 1.6 (260) | −0.4 (260) | (260) | 0.23 (260) |

TABLE 2-continued

| Comparative Example No. | 1 | 2 | 3 | 4 |
| --- | --- | --- | --- | --- |
| log R calculated by the equation (1) | | | | |
| Upper limit | 1.5 | 1.5 | — | 2.0 |
| Lower limit | −0.2 | −0.2 | — | 0.3 |
| Film thickness (μm) | 51 | 47 | 51 | 40 |
| Haze (%) | | | | |
| Initial value | 3.0 | 9.9 | 1.3 | 2.5 |
| After treatment with hot water | 8.2 | 13.5 | 78.6 | 30.1 |
| Oxygen permeation rate (cc/m² · day · atm) | 11.3 | 12.6 | 10.5 | 13.0 |

Conditions for measurement of oxygen permeation rate: 100 RH

EXAMPLE 7

Pellets of nylon MXD6 (relative viscosity: 3.0) and pellets of nylon 66 (relative viscosity: 2.4) were mixed with a tumbler to prepare a pellet mixture having a nylon MXD6/nylon 66 blend ratio of 90/10 (by weight) (melt viscosity ratio: 27.4, measured at 285° C.).

Then, this polyamide pellet mixture was extruded with a single-screw extruder (screw diameter: 20 mmφ, L/D: 25, screw type: full flighted) according to a T-die method at a cylinder temperature between 265° C. and 270° C., at a T-die temperature of 270° C. at a screw revolution rate of 40 rpm and at a cooling roll temperature of 75° C., whereby a film having a width of about 120 mm and a thickness of about 53 μm was obtained.

The above-obtained film showed a haze value of 1.1%, and it was treated with hot water to show a haze value of 5.9%. Thus, it retained the initial excellent transparency. Table 3 shows the composition of the starting materials and the results.

COMPARATIVE EXAMPLE 5

A film having a thickness of 30 μm was obtained from the same nylon MXD6 as that used in Example 7 in the same manner as in Example 7. The so-obtained film showed a haze value of 2.3%, and was treated with hot water to show a haze value of 46.8%, and a clear whitening was observed. Table 4 shows the composition of the starting material and the results.

EXAMPLE 8

Pellets of nylon MXD6 (relative viscosity: 2.6) and pellets of nylon 66 (relative viscosity: 3.3) were mixed with a tumbler to prepare a pellet mixture having a nylon MXD6/nylon 66 blend ratio of 40/60 (by weight) (melt viscosity ratio: 0.7, measured at 285° C.).

Then, this pellet mixture was melted and kneaded with a single-screw extruder (screw diameter: 20 mm, L/D: 25, screw type: full flighted) at a temperature of 275° C., and extruded according to T-die method to give a sheet having a thickness of 225 μm.

In the above process, the resin temperature at an outlet of the die was 273° C., and the residence time was 1.8 minutes.

The above-obtained sheet (90 mm×90 mm) was heated at 100° C. for 5 seconds and then simultaneously biaxially stretched at a stretch ratio of 3×3 at a stretch rate of 3 m/minute with a biaxially stretching machine (according to a tenter method, supplied by Toyo Seiki K. K.).

The resultant stretched film had a thickness of 25 μm, and showed a haze value of 3.0%.

Further, the above stretched film was thermoset in an atmosphere at 260° C. for 5 seconds. The thermoset film was subjected to a hot water treatment (30 minutes/immersion in boiling water) to show a haze value of 3.2%.

Thus, the stretched film had excellent transparency. Table 3 shows the composition of the starting materials and the results.

COMPARATIVE EXAMPLE 6

Pellets of nylon MXD6 (relative viscosity: 3.6) and pellets of nylon 66 (relative viscosity: 2.8) were mixed with a tumbler to prepare a pellet mixture having a nylon MXD6/nylon 66 blend ratio of 40/60 (by weight) (melt viscosity ratio: 10.0, measured at 285° C.).

Then, this pellet mixture was melted and mixed with a single-screw extruder (screw diameter: 20 mm, L/D: 25, screw type: full flighted) at a temperature of 275° C., and extruded according to T-die method to give a sheet having a thickness of 220 μm.

In the above process, the resin temperature at an outlet of the die was 275° C., and the residence time was 1.8 minutes. The above-obtained sheet (90 mm×90 mm) was heated at 100° C. for 5 seconds and then simultaneously biaxially stretched at a stretch ratio of 3×3 at a stretch rate of 3 m/minute with a biaxially stretching machine (according to a tenter method, supplied by Toyo Seiki K. K.).

The resultant stretched film having a thickness of 25 μm showed a haze value of 5.3%, which was inferior in transparency to that of the film obtained in Example 8. Table 4 shows the composition of the starting material and the results.

EXAMPLE 9

Pellets of nylon MXD6 (relative viscosity: 3.6) and pellets of nylon 6 (relative viscosity: 4.1) were mixed with a tumbler to prepare a pellet mixture having a nylon MXD6/nylon 6 blend ratio of 40/60 (by weight) (melt viscosity ratio: 1.7, measured at 260° C.).

Then, this pellet mixture was extruded with a single-screw extruder (screw diameter: 20 mm, L/D: 25, screw type: full flighted) according to a T-die method at a cylinder temperature between 265° C. and 270° C. at a T-die temperature of 260° C. at a screw revolution rate of 60 rpm and at a cooling roll temperature of 60° C., whereby a sheet having a width of 120 cm and a thickness of 230 μm was obtained.

In the above process, the resin temperature at an outlet of the die was 269° C., and the residence time was 2.3 minutes.

Then, the above-obtained sheet (90 mm×90 mm) was heated at 85° C. for 20 seconds and then simultaneously biaxially stretched at a stretch ratio of 3×3 at a stretch rate of 3 m/minute with a biaxially stretching machine (according to a tenter method, supplied by Toyo Seiki K. K.).

The resultant stretched film had a thickness of 25 μm, and showed a haze value of 3.0%.

Further, the above stretched film was thermoset in an atmosphere at 250° C. for 5 seconds. The thermoset film was subjected to a hot water treatment (30 minutes/immersion in boiling water) to show a haze value of 2.8%. Thus, the stretched film had excellent transparency. Table 3 shows the composition of the starting materials and the results.

EXAMPLE 10

Pellets of nylon MXD6 (relative viscosity: 3.6) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 1.7, measured at 260° C.).

This pellet mixture was extruded with a single-screw extruder (screw diameter: 20 mm, L/D: 25, screw type: full flighted) according to a T-die method at a cylinder temperature between 260° C. and 270° C. at a T-die temperature of 260° C. at a screw revolution rate of 90 rpm and at a cooling roll temperature of 60° C., whereby a sheet having a width of 120 cm and a thickness of 230 μm was obtained.

In the above process, the resin temperature at an outlet of the die was 269° C., and the residence time was 1.8 minutes.

Then, the above-obtained sheet (90 mm × 90 mm) was heated at 85° C. for 20 seconds and then simultaneously biaxially stretched at a stretch ratio of 3×3 at a stretch rate of 3 m/minute with a biaxially stretching machine (according to a tenter method, supplied by Toyo Seiki K. K.).

The resultant stretched film had a thickness of 25 μm, and showed a haze value of 3.2%.

Further, the above stretched film was thermoset in an atmosphere at 250° C. for 5 seconds. The thermoset film was subjected to a hot water treatment (30 minutes/immersion in boiling water) to show a haze value of 3.3%. Thus, the stretched film had excellent transparency. Table 3 shows the composition of the starting materials and the results.

COMPARATIVE EXAMPLE 7

Pellets of nylon MXD6 (relative viscosity: 2.6) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 0.4, measured at 260° C.).

This pellet mixture was extruded with a single-screw extruder (screw diameter: 20 mm, L/D: 25, screw type: full flighted) according to a T-die method at a cylinder temperature between 260° C. and 270° C. at a T-die temperature of 260° C. at a screw revolution rate of 90 rpm and at a cooling roll temperature of 60° C., whereby a sheet having a width of 120 cm and a thickness of 500 μm was obtained.

In the above process, the resin temperature at an outlet of the die was 260° C., and the residence time was 1.8 minutes.

Then, the above-obtained sheet (90 mm × 90 mm) was heated at 85° C. for 20 seconds and then simultaneously biaxially stretched at a stretch ratio of 3×3 at a stretch rate of 3 m/minute with a biaxially stretching machine (according to a tenter method, supplied by Toyo Seiki K. K.).

The resultant stretched film having a thickness of 45 μm showed a haze value of 16.3%, and it was inferior in transparency to that of the film obtained in Example 10. Table 4 shows the composition of the starting materials and the results.

TABLE 3

| Example No. | 7 | 8 | 9 | 10 |
|---|---|---|---|---|
| Relative viscosities of polyamides | | | | |
| N-MXD6 | 3.6 | 2.6 | 3.6 | 3.6 |
| Polyamide B Nylon 6 | — | — | 4.1 | 4.1 |
| Nylon 66 | 2.4 | 3.3 | — | — |
| Blend ratio (by weight) (N-MXD6/nylon 6) | 90/10 | 40/60 | 40/60 | 80/20 |
| Melt viscosity ratio R | 27.4 | 0.7 | 1.7 | 1.7 |
| log R | 1.4 | −0.2 | 0.2 | 0.2 |

TABLE 3-continued

| Example No. | 7 | 8 | 9 | 10 |
|---|---|---|---|---|
| (Measurement temperature °C. for R) | (285) | (285) | (260) | (260) |
| log R calculated by the equation (1) | | | | |
| Upper limit | 1.8 | 0.5 | 0.5 | 1.5 |
| Lower limit | 0.1 | −1.2 | −1.2 | −0.2 |
| Film thickness (μm) | 53 | 25 | 25 | 25 |
| Haze (%) | | | | |
| Initial value | 1.1 | 3.0 | 3.0 | 3.2 |
| After treatment with hot water | 5.9 | 3.2 | 2.8 | 3.3 |
| Oxygen permeation rate (cc/m² · day · atm) | 2.7 | 5.1 | 4.8 | 2.6 |

Conditions for measurement of oxygen permeation rate: 60% RH

TABLE 4

| Comparative Example No. | 5 | 6 | 7 |
|---|---|---|---|
| Relative viscosities of polyamides | | | |
| N-MXD6 | 3.6 | 3.6 | 2.6 |
| Polyamide Nylon 6 | — | — | 4.1 |
| Nylon 66 | — | 2.8 | — |
| Blend ratio (by weight) (N-MXD6/nylon 6) | 100/0 | 40/60 | 80/20 |
| Melt viscosity ratio R | — | 10.0 | 0.4 |
| log R | | 1.0 | −0.4 |
| (Measurement temperature °C. for R) | — | (285) | (260) |
| log R calculated by the equation (1) | | | |
| Upper limit | — | 0.5 | 1.5 |
| Lower limit | — | −1.2 | −0.2 |
| Film thickness (μm) | 30 | 25 | 45 |
| Haze (%) | | | |
| Initial value | 2.3 | 5.3 | 16.3 |
| After treatment with hot water | 46.8 | — | — |
| Oxygen permeation rate (cc/m² · day · atm) | 3.7 | 11.3 | 22.8 |

Conditions for measurement of oxygen permeation rate: 60% RH

EXAMPLE 11

Pellets of nylon MXD6 (relative viscosity: 3.56) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 1.7).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 270° C., and the residence time was 3 minutes.

The above-obtained film had excellent transparency.

Table 5 shows the composition of the starting materials, the film-forming conditions and the results.

EXAMPLE 12

Pellets of nylon MXD6 (relative viscosity: 3.56) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 1.7).

This pellet mixture was extruded with a single-screw extruder (screw diameter: 20 mm, L/D: 25, screw type: full flighted) according to a T-die method at a cylinder temperature between 270° C. and 290° C. at a T-die temperature of 290° C. at a screw revolution rate of 42 rpm and at a cooling roll temperature of 75° C., whereby a film having a width of about 120 mm and a thickness of about 0.05 mm was obtained.

In the above process, the resin temperature at an outlet of the die was 288° C., and the residence time was 2.8 minutes.

The above-obtained film had excellent transparency.

Table 5 shows the composition of the starting materials, the film-forming conditions and the results.

COMPARATIVE EXAMPLE 8

Pellets of nylon MXD6 (relative viscosity: 3.56) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 1.7).

This pellet mixture was extruded with a single-screw extruder (screw diameter: 20 mm, L/D: 25, screw type: full flighted) according to a T-die method at a cylinder temperature between 270° C. and 290° C. at a T-die temperature of 290° C. at a screw revolution rate of 42 rpm and at a cooling roll temperature of 75° C., whereby a film having a width of about 125 mm and a thickness of about 0.10 mm was obtained.

In the above process, the resin temperature at an outlet of the die was 288° C., and the residence time was 2.8 minutes.

In order to prepare a film sample obtained under a longer residence time, the above-obtained film was crushed to such small pieces that they could be fed to an extruder, and extruded with the same extruder under the same conditions to form a film.

This film was again crushed into small pieces, and extruded for the third time to form a film.

Upon the third extrusion, the total residence time was 8.2 minutes. Table 6 shows the haze value and oxygen permeability of the film obtained by the third extrusion together with the composition of the starting materials and the film-forming conditions.

COMPARATIVE EXAMPLE 9

Pellets of nylon MXD6 (relative viscosity: 2.64) and pellets of nylon 6 (relative viscosity: 4.1) were mixed with a tumbler to prepare a pellet mixture having a nylon MXD6/nylon 6 blend ratio of 80/20 (by weight) (melt viscosity ratio: 0.39).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 268° C., and the residence time was 3 minutes.

The above-obtained film had a higher haze value than that obtained in Example 12, and it was also treated with hot water to show a higher haze than that treated with hot water in Example 12.

Table 6 shows the composition of the starting materials and the film-forming conditions.

EXAMPLE 13

Pellets of nylon MXD6 (relative viscosity: 3.56) and pellets of nylon 6 (relative viscosity: 4.1) were mixed with a tumbler to prepare a pellet mixture having a nylon MXD6/nylon 6 blend ratio of 40/60 (by weight) (melt viscosity ratio: 1.7).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 269° C., and the residence time was 3 minutes.

The above-obtained film had excellent transparency.

Table 5 shows the composition of the starting materials, the film-forming conditions and the results.

EXAMPLE 14

Pellets of nylon MXD6 (relative viscosity: 2.64) and pellets of nylon 6 (relative viscosity: 4.1) were mixed with a tumbler to prepare a pellet mixture having a nylon MXD6/nylon 6 blend ratio of 40/60 (by weight) (melt viscosity ratio: 0.39).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 270° C., and the residence time was 3 minutes.

The above-obtained film had excellent transparency, and the degree of the increase in the haze value after the hot water treatment was small.

Table 5 shows the composition of the starting materials, the film-forming conditions and the results.

EXAMPLE 15

Pellets of nylon MXD6 (relative viscosity: 3.56) and pellets of nylon 6 (relative viscosity: 3.5) were mixed with a tumbler to prepare a pellet mixture having a nylon MXD6/nylon 6 blend ratio of 60/40 (by weight) (melt viscosity ratio: 3.1).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 269° C., and the residence time was 3 minutes.

The above-obtained film had excellent transparency, and the degree of an increase in the haze value after the hot water treatment was small.

Table 5 shows the composition of the starting materials, the film-forming conditions and the results.

COMPARATIVE EXAMPLE 10

Pellets of nylon MXD6 (relative viscosity: 2.10) and pellets of nylon 6 (relative viscosity: 4.1) were mixed with a tumbler to prepare a pellet mixture having a nylon MXD6/nylon 6 blend ratio of 60/40 (by weight) (melt viscosity ratio: 1.7).

It was attempted to form a film from the above pellet mixture with the same extruder as that used in Example 15 under the same conditions as those in Example 15. However, no film having a uniform thickness could be formed.

In the above process, the resin temperature at an outlet of the die was 268° C., and the residence time was 3 minutes.

Table 6 shows the composition of the starting materials, the film-forming conditions and the results.

COMPARATIVE EXAMPLE 11

Pellets of nylon MXD6 (relative viscosity: 2.64) and pellets of nylon 6 (relative viscosity: 2.22) were mixed with a tumbler to prepare a pellet mixture having a nylon MXD6/nylon 6 blend ratio of 40/60 (by weight) (melt viscosity ratio: 10).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 75° C., whereby a film having a width of about 120 mm and a thickness of about 0.05 mm was obtained.

In the above process, the resin temperature at an outlet of the die was 270° C., and the residence time was 3 minutes.

The above-obtained film had a higher haze value than that obtained in Example 1, and the degree of an increase in the haze value after the hot water treatment was larger.

Table 6 shows the composition of the starting materials, the film-forming conditions and the results.

EXAMPLE 16

Pellets of nylon MXD6 (relative viscosity: 2.64) and pellets of nylon 6 (relative viscosity: 3.5) were mixed with a tumbler to prepare a pellet mixture having a nylon MXD6/nylon 6 blend ratio of 20/80 (by weight) (melt viscosity ratio: 0.77).

This pellet mixture was extruded with a single-screw extruder (screw diameter: 20 mm, L/D: 25, screw type: full flighted) according to a T-die method at a cylinder temperature between 245° C. and 260° C. at a T-die temperature of 260° C. at a screw revolution rate of 40 rpm and at a cooling roll temperature of 65° C., whereby a film having a width of about 120 mm and a thickness of about 0.05 mm was obtained.

In the above process, the resin temperature at an outlet of the die was 258° C., and the residence time was 3 minutes.

The above-obtained film had excellent transparency.

Table 5 shows the composition of the starting materials, the film-forming conditions and the results.

EXAMPLE 17

Pellets of nylon MXD6 (relative viscosity: 2.64) and pellets of nylon 6 (relative viscosity: 4.1) were mixed with a tumbler to prepare a pellet mixture having a nylon MXD6/nylon 6 blend ratio of 20/80 (by weight) (melt viscosity ratio: 0.39).

This pellet mixture was extruded with a single-screw extruder (screw diameter: 20 mm, L/D: 25, screw type: full flighted) according to a T-die method at a cylinder temperature between 265° C. and 270° C. at a T-die temperature of 270° C. at a screw revolution rate of 40 rpm and at a cooling roll temperature of 65° C., whereby a film having a width of about 120 mm and a thickness of about 0.05 mm was obtained.

In the above process, the resin temperature at an outlet of the die was 269° C., and the residence time was 3 minutes.

The above-obtained film had excellent transparency, and the degree of an increase in the haze value after the hot water treatment was small.

Table 5 shows the composition of the starting materials, the film-forming conditions and the results.

COMPARATIVE EXAMPLE 12

Pellets of nylon MXD6 (relative viscosity: 3.56) and pellets of nylon 6 (relative viscosity: 4.1) were mixed with a tumbler to prepare a pellet mixture having a nylon MXD6/nylon 6 blend ratio of 20/80 (by weight) (melt viscosity ratio: 1.7).

This pellet mixture was extruded with a single-screw extruder (screw diameter: 20 mm, L/D: 25, screw type: full flighted) according to a T-die method at a cylinder temperature between 245° C. and 260° C. at a T-die temperature of 260° C. at a screw revolution rate of 40 rpm and at a cooling roll temperature of 65° C., whereby a film having a width of about 120 mm and a thickness of about 0.05 mm was obtained.

In the above process, the resin temperature at an outlet of the die was 259° C., and the residence time was 3 minutes.

The above-obtained film had a higher haze value than those obtained in Examples 10 and 11, and it was treated with hot water to show a higher haze value than those obtained in Examples 10 and 11.

Table 6 shows the composition of the starting materials, the film-forming conditions and the results.

EXAMPLE 18

Pellets of nylon MXD6 (relative viscosity: 3.56) and pellets of nylon 66 (relative viscosity: 3.31) were mixed with a tumbler to prepare a pellet mixture having a nylon MXD6/nylon 66 blend ratio of 85/15 (by weight) (melt viscosity ratio: 2.70).

This pellet mixture was mixed and melted at 275° C. with a single-screw extruder (screw diameter: 40 mm, L/D: 22, screw type: full flighted), and formed into a film having a thickness of 32 $\mu$m through a ring die according to an air-cooling inflation method.

In the above process, the resin temperature at the outlet of the die was 273° C., and the residence time was 2.5 minutes.

The above-obtained film showed a haze value of 2.5%, and it was immersed in boiling water for 30 minutes to show a haze value of 4.9%. Thus, the initial good transparency was well retained.

A film having a thickness of 30 $\mu$m was formed from nylon MXD6 (relative viscosity 3.56) in the same manner as above. This film showed a haze value of 2.3%, and it was treated with hot water to show a haze value of 46.8%. Thus, a whitening was clearly observed.

Table 5 shows the composition of the starting materials, the film-forming conditions and the results.

TABLE 5

| Example No. | 11 | 12 | 13 | 14 | 15 | 16 | 17 | 18 |
|---|---|---|---|---|---|---|---|---|
| Relative viscosities of polyamides | | | | | | | | |
| N-MXD6 | 3.6 | 3.6 | 3.6 | 2.6 | 3.6 | 2.6 | 2.6 | 3.6 |
| Polyamide B Nylon 6 | 4.1 | 3.5 | 4.1 | 4.1 | 3.5 | 3.5 | 4.1 | — |
| Nylon 66 | — | — | — | — | — | — | — | 3.3 |
| Blend ratio (by weight) | | | | | | | | |
| N-MXD6/nylon 6 | 80/20 | 80/20 | 40/60 | 40/60 | 60/40 | 20/80 | 20/80 | — |
| N-MXD6/nylon 66 | — | — | — | — | — | — | — | 85/15 |
| Melt viscosity ratio R | 1.7 | 1.7 | 1.7 | 0.4 | 3.5 | 0.8 | 0.4 | 2.7 |
| log R | 0.2 | 0.2 | 0.2 | −0.4 | 0.5 | −0.1 | −0.4 | 0.4 |
| (Measurement temperature °C. for R) | (260) | (260) | (260) | (260) | (260) | (260) | (260) | (285) |
| log R calculated by the equation (1) | | | | | | | | |
| Upper limit | 1.5 | 1.5 | 0.5 | 0.5 | 1.0 | 0.0 | 0.0 | 1.6 |
| Lower limit | −0.2 | −0.2 | −1.2 | −1.2 | −0.7 | −1.7 | −1.7 | −0.1 |
| Film thickness (μm) | 50 | 51 | 52 | 50 | 52 | 48 | 50 | 32 |
| Residence time (min.) | 3.0 | 2.8 | 3.0 | 3.0 | 3.0 | 3.0 | 3.0 | 2.5 |
| Film-forming temperature (°C.) | 270 | 288 | 269 | 270 | 269 | 258 | 269 | 273 |
| Haze (%) | | | | | | | | |
| Initial value | 1.5 | 1.3 | 1.5 | 1.3 | 1.9 | 2.1 | 2.3 | 2.5 |
| After treatment with hot water | 4.2 | 4.2 | 4.2 | 4.2 | 4.3 | 4.4 | 4.5 | 4.9 |
| Oxygen permeation rate (cc/m² · day · atm) | 6.4 | 6.5 | 8.5 | 8.8 | 8.6 | 15.0 | 14.0 | 6.3 |

Conditions for measurement of oxygen permeation rate: 100% RH

TABLE 6

| Comparative Example No. | 8 | 9 | 10 | 11 | 12 |
|---|---|---|---|---|---|
| Relative viscosities of polyamides | | | | | |
| N-MXD6 | 3.6 | 2.6 | 2.1 | 2.6 | 3.6 |
| Polyamide B Nylon 6 | 4.1 | 4.1 | 4.1 | 2.2 | 4.1 |
| Blend ratio (by weight) | 80/20 | 80/20 | 60/40 | 40/60 | 20/80 |
| N-MXD6/nylon 6 | | | | | |
| Melt viscosity ratio R | 1.7 | 0.4 | 0.1 | 10.0 | 1.7 |
| log R | 0.2 | −0.4 | −1.0 | 1.0 | 0.2 |
| (Measurement temperature °C. for R) | (260) | (260) | (260) | (260) | (260) |
| log R calculated by the equation (1) | | | | | |
| Upper limit | 1.5 | 1.5 | 1.0 | 0.5 | 0.0 |
| Lower limit | −0.2 | −0.2 | −0.7 | −1.2 | −1.7 |
| Film thickness (μm) | 52 | 51 | — | 50 | 47 |
| Residence time (min.) | 8.2 | 3.0 | 3.0 | 3.0 | 3.0 |
| Film-forming temperature (°C.) | 288 | 268 | 268 | 270 | 259 |
| Haze (%) | | | | | |
| Initial value | 1.2 | 4.8 | | 7.7 | 7.6 |
| After treatment with hot water | 11.2 | 9.5 | poor formability | 14.1 | 12.9 |
| Oxygen permeation rate (cc/m² · day · atm) | 8.8 | 6.9 | | 9.2 | 15.0 |

Conditions for measurement of oxygen permeation rate: 100% RH

What is claimed is:

1. A polyamide resin composition obtained by melting and kneading
    (A) a first polyamide containing not less than 90 mol %, based on the total recurring units, of a m-xylylene adipamide unit of the formula,

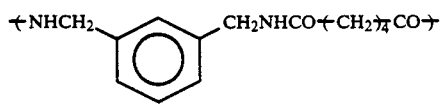

and
    (B) a second polyamide showing a semicrystallization time of not more than 30 seconds in a constant-temperature crystallization at 160° C. and having a solubility parameter in the range of 13±1.5;
    (C) under the conditions where the following relationship is satisfied, $$(0.025C - 2.2) \leq \log R \leq (0.025C - 0.5)$$

wherein C is a proportion (wt. %) of the first polyamide based on the total weight of the first and second polyamides, and R is a ratio of the melt viscosity of the first polyamide to the melt viscosity of the second polyamide at a temperature higher by 20° C. than the melting point of that one of the first and second polyamides which has a higher melting point than the other, provided that C is in the range of 40 to 95 (wt. %).

2. The resin composition of claim 1, wherein the second polyamide is polyamide 6 or polyamide 66.

3. An unstretched film obtained from the polyamide resin composition of claim 1, which shows a haze value of not more than 7% when it is converted to a film having a thickness of 50 μm.

4. The unstretched film of claim 3, wherein the first polyamide (A) is contained in a proportion (C) of 60 to 95% by weight based on the total weight of the first polyamide and the second polyamide.

5. A biaxially stretched film obtained from the polyamide resin composition of claim 1, which shows a haze value of not more than 3.5% when it is converted to a film having a thickness of 25 μm.

6. The biaxially stretched film of claim 5, wherein the first polyamide (A) is contained in a proportion (C) of 40 to 60% by weight based on the total weight of the first polyamide and the second polyamide.

7. The resin of claim 1 wherein the first polyamide (A) is contained in a proportion (C) of 40 to 60% by weight, based on the total weight of the first polyamide and the second polyamide.

* * * * *